United States Patent
Grabowski et al.

(10) Patent No.: US 11,548,569 B2
(45) Date of Patent: Jan. 10, 2023

(54) PICKUP TRUCK CARGO BED UTILITY WALL

(71) Applicant: GM GLOBAL TECHNOLOGY OPERATIONS LLC, Detroit, MI (US)

(72) Inventors: Thomas P. Grabowski, Shelby Township, MI (US); Kurt Baldauf, Waterford, MI (US); John David Taylor, Royal Oak, MI (US); Charles Salvatore Calcaterra, Warren, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 84 days.

(21) Appl. No.: 17/325,633

(22) Filed: May 20, 2021

(65) Prior Publication Data

US 2022/0371666 A1 Nov. 24, 2022

(51) Int. Cl.
*B60J 7/00* (2006.01)
*B62D 33/02* (2006.01)
*B62D 29/00* (2006.01)
*B62D 33/023* (2006.01)

(52) U.S. Cl.
CPC ....... *B62D 33/0207* (2013.01); *B62D 29/008* (2013.01); *B62D 33/023* (2013.01)

(58) Field of Classification Search
CPC ..... E04B 2002/7483; E04B 2002/7487; E04B 2002/749; E04B 2002/7462; E04B 2002/7488; B60R 9/06; B65D 2571/00141; B65D 2571/0066; Y02E 60/50; E06B 9/02
See application file for complete search history.

(56) References Cited

U.S. PATENT DOCUMENTS

| | | | | |
|---|---|---|---|---|
| 4,005,898 A | * | 2/1977 | Way | B60P 3/423 5/118 |
| 4,540,214 A | * | 9/1985 | Wagner | B60R 13/01 105/423 |
| 4,750,776 A | * | 6/1988 | Barben | B60R 13/01 296/39.2 |
| 4,815,787 A | * | 3/1989 | Hale | B60P 3/32 296/10 |
| 5,505,512 A | * | 4/1996 | Martindale | B60R 13/01 296/39.2 |
| 5,799,849 A | * | 9/1998 | Beer | B60R 11/00 224/403 |

(Continued)

*Primary Examiner* — Kiran B Patel

(57) ABSTRACT

A utility wall for a pickup truck includes: a first portion disposed along a first plane and including alternating first and second vertical columns of apertures, where: the first vertical columns include a vertically repeating pattern including: first rectangular apertures with longer sides oriented in a first direction; ovular apertures; and circular apertures; and the second vertical columns include second rectangular apertures with longer sides oriented in a second direction that is different than the first direction; second and third portions disposed along a second plane that is parallel to the first plane, the second and third portions including bolt apertures through which bolts can extend to bolt the utility wall to the pickup truck; a first c-shaped portion that connects a first end of the first portion to the second portion; and a second c-shaped portion that connects a second end of the first portion to the third portion.

20 Claims, 8 Drawing Sheets

(56) References Cited

U.S. PATENT DOCUMENTS

| | | | |
|---|---|---|---|
| 6,217,102 B1* | 4/2001 | Lathers | B60J 7/1614 |
| | | | 296/100.1 |
| 6,658,805 B1* | 12/2003 | Yu | E04B 2/7422 |
| | | | 52/239 |
| 9,193,294 B1* | 11/2015 | Egigian | B60P 7/0807 |
| 2001/0038230 A1* | 11/2001 | Clare | B60R 11/06 |
| | | | 296/37.6 |
| 2008/0014041 A1* | 1/2008 | Randazzo | B60P 7/0815 |
| | | | 410/104 |
| 2010/0007175 A1* | 1/2010 | Mayer | B60R 7/04 |
| | | | 296/190.01 |
| 2010/0064597 A1* | 3/2010 | Eberlein | E04B 2/7425 |
| | | | 52/36.5 |
| 2013/0168425 A1* | 7/2013 | Cauley | B60R 9/10 |
| | | | 224/403 |
| 2019/0100253 A1* | 4/2019 | McKinney | B62D 33/02 |
| 2019/0248424 A1* | 8/2019 | McKinney | B60R 13/01 |

\* cited by examiner

PICKUP TRUCK CARGO BED UTILITY WALL

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to pickup trucks and more particularly to utility walls for pickup truck beds.

Various different types of vehicles are sold throughout the world. Examples of vehicles include coupes, sedans, utility vehicles, pickup trucks, and other types of vehicles.

Pickup trucks come in various different sizes. For example, pickup trucks are available in both two and four door varieties. Multiple different sizes of passenger cabins are also available in pickup trucks.

Pickup trucks all have a cargo bed. Different sizes of cargo beds are available, such as 60" long to 100" long and various sizes between 60" and 100". Items can be placed within a cargo bed of a pickup truck and moved from place to place.

SUMMARY

In a feature, a utility wall for a pickup truck is described and includes: a first portion disposed along a first plane and including alternating first and second vertical columns of apertures, where: the first vertical columns include a vertically repeating pattern including: first rectangular apertures with longer sides oriented in a first direction; ovular apertures; and circular apertures; and the second vertical columns include second rectangular apertures with longer sides oriented in a second direction that is different than the first direction; second and third portions disposed along a second plane that is parallel to the first plane, the second and third portions including bolt apertures through which bolts can extend to bolt the utility wall to the pickup truck; a first c-shaped portion that connects a first end of the first portion to the second portion; and a second c-shaped portion that connects a second end of the first portion to the third portion.

In further features, the first and second rectangular apertures have rounded corners.

In further features, the vertically repeating pattern includes: a first one of the first rectangular apertures; one of the ovular apertures disposed vertically below the first one of the first rectangular apertures; a second one of the first rectangular apertures disposed vertically below the one of the ovular apertures; and one of the circular apertures disposed vertically below the second one of the first rectangular apertures.

In further features: a first distance between a vertically upper edge of the one of the ovular apertures and a vertically lower most edge of the first one of the first rectangular apertures is approximately 10.5 millimeters; and a second distance between a vertically lower most edge of the one of the ovular apertures and a vertically upper most edge of the second one of the first rectangular apertures is approximately 10.5 millimeters.

In further features: a first distance between a vertically upper most point of the one of the circular apertures and a vertically lower most edge of the second one of the first rectangular apertures is approximately 10.5 millimeters; and a second distance between a vertically lower most point of the one of the circular apertures and a vertically upper most edge of a third one of the first rectangular apertures is approximately 10.5 millimeters.

In further features, the first rectangular apertures are approximately 25 millimeters by 40 millimeters.

In further features, the second rectangular apertures are approximately 25 millimeters by 40 millimeters.

In further features, the first direction is approximately 90 degrees from the second direction.

In further features, the ovular apertures are approximately 9 millimeters vertically by approximately 30 millimeters horizontally.

In further features, the circular apertures have a diameter of approximately 9 millimeters.

In further features, a distance between a horizontally left most edge of each of the second rectangular apertures is approximately 15 millimeters from a horizontally right most edge of each of the first rectangular apertures.

In further features, a distance between a horizontally right most edge of each of the second rectangular apertures is approximately 15 millimeters from a horizontally left most edge of each of the first rectangular apertures.

In further features, the first portion, the second portion, the third portion, the first c-shaped portion, and the second c-shaped portion are made of aluminum.

In further features, the first portion, the second portion, the third portion, the first c-shaped portion, and the second c-shaped portion are made of approximately 6 millimeter thick aluminum.

In further features, a distance between vertically bottom most edges of the second rectangular apertures and vertically upper most edges of adjacent ones of the second rectangular apertures is approximately 15 millimeters.

In further features: a vertically upper most edge of one of the ovular apertures falls on a first line with a vertically lower most edge of a first one of the second rectangular apertures; and a vertically lower most edge of the one of the ovular apertures falls on a second line with a vertically upper most edge of a second one of the second rectangular apertures.

In further features: a vertically upper most point of one of the circular apertures falls on a first line with a vertically lower most edge of a first one of the second rectangular apertures; and a vertically lower most point of the one of the circular apertures falls on a second line with a vertically upper most edge of a second one of the second rectangular apertures.

In further features, a portion of the first portion extends vertically over a wheel well of the pickup truck.

In further features, the second and third portions include the bolt apertures through which bolts can extend to bolt the utility wall to one of a left, right, front, and rear interior portion of the cargo bed.

In a feature, a system for the pickup truck includes: the utility wall; and a latch configured to latch to the utility wall via the first rectangular apertures and the second rectangular apertures.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Pickup trucks include a cargo bed where cargo can be stored during transport from location to location. Wheel wells above rear wheels of the vehicle may extend into the cargo bed and occupy volume of the cargo bed.

The present application involves a utility wall that is configured to be mounted to an interior (e.g., front, rear, left, right) portion of the cargo bed of a pickup truck. The utility wall includes apertures following a modular light weight load carrying equipment (MOLLE) scheme. Some of the apertures can be used to mount universal latches in multiple different directions. Additionally, other ones of the apertures can be used to attach items by bolt (e.g., M6 bolts) to the utility wall. Utility walls that extend vertically over a wheel well can help make space above the wheel well within the cargo bed more useful for storage.

Figure 1:
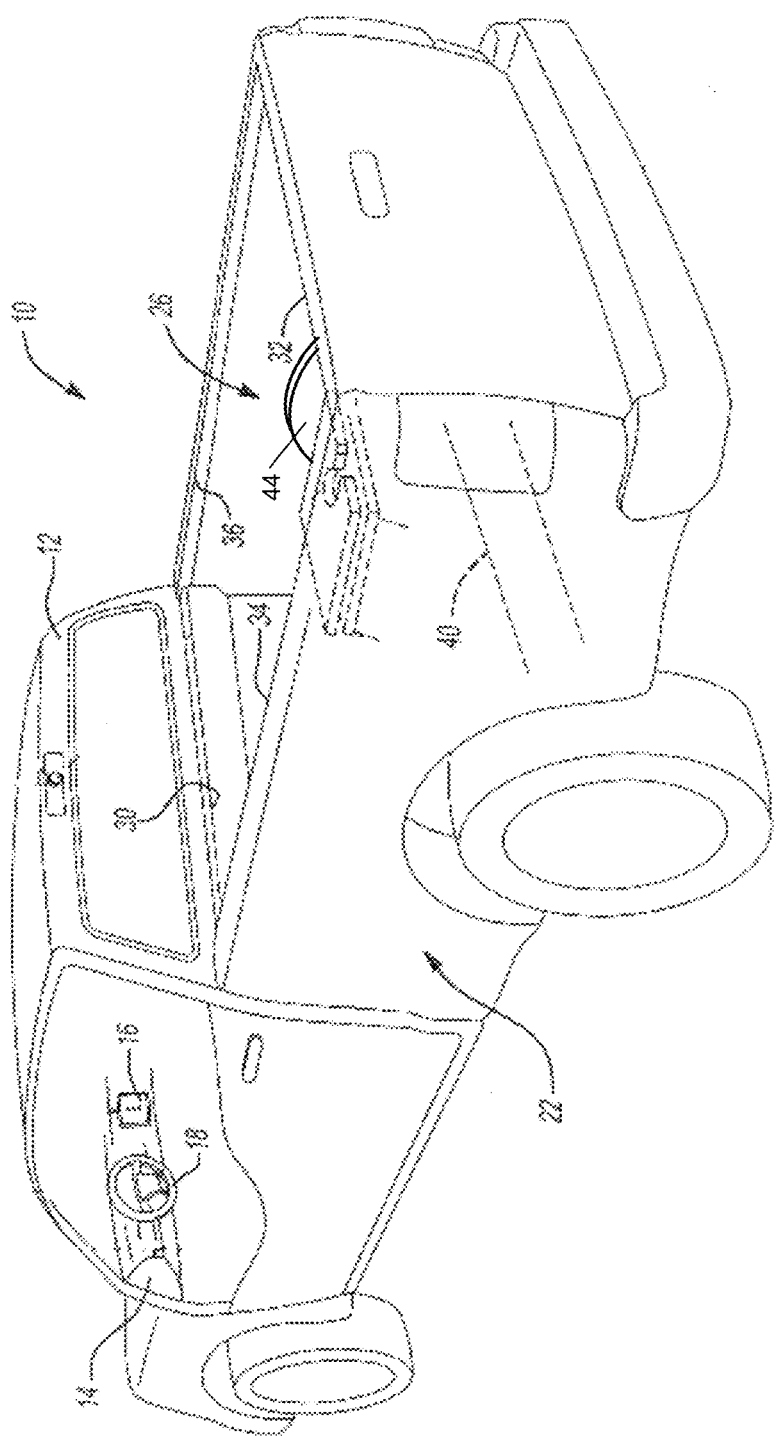
FIG. 1 is a rear perspective view of an example truck.

FIG. 1 is a rear perspective view of an example (pickup) truck 10. The truck 10 includes a cab 12 and may include an instrument panel 14, an electronic display 16, and a steering wheel 18. Passengers sit within the cab 12. The cab 12 may also be referred to as a passenger cabin.

The truck 10 includes a cargo bed 22 and may include one or more trailer hitches, such as 26. The cargo bed 22 may be referred to as a bed. In various implementations, the trailer hitch 26 may be omitted.

The cargo bed 22 has a front interior portion 30, a rear interior portion 32, a left interior portion 34, and a right interior portion 36. The front, rear, left, and right interior portions 30, 32, 34, and 36 extend vertically from an upper edge to a floor of the cargo bed 22.

A rear axle 40 transfers torque to and from rear wheels of the truck 10. Wheel wells, such as 44, surround the rear wheels and extend (horizontally and vertically) into the cargo bed 22. In other words, the wheel wells 44 occupy volume of the cargo bed 22. Portions of the left and right interior portions 34 and 36 are disposed vertically above the wheel wells 44. Various threated bolt holes may be formed in at least one of the front, rear, left, and right interior portions 30, 32, 34, and 36. The rear interior portion 32 may be an interior side of a tail gate.

The present application involves a utility wall configured to be mounted to the left and right interior portion 34 and 36 of the cargo bed 22. While the example of mounting the utility wall to the left interior portion 34 of the cargo bed 22 will be discussed, the present application is also applicable to mounting the utility wall to the left interior portion 34, the front interior portion 30, the rear interior portion 32, and a floor (e.g., the floor of the cargo bed 22, a floor within the cab 12, etc.).

Figure 2:
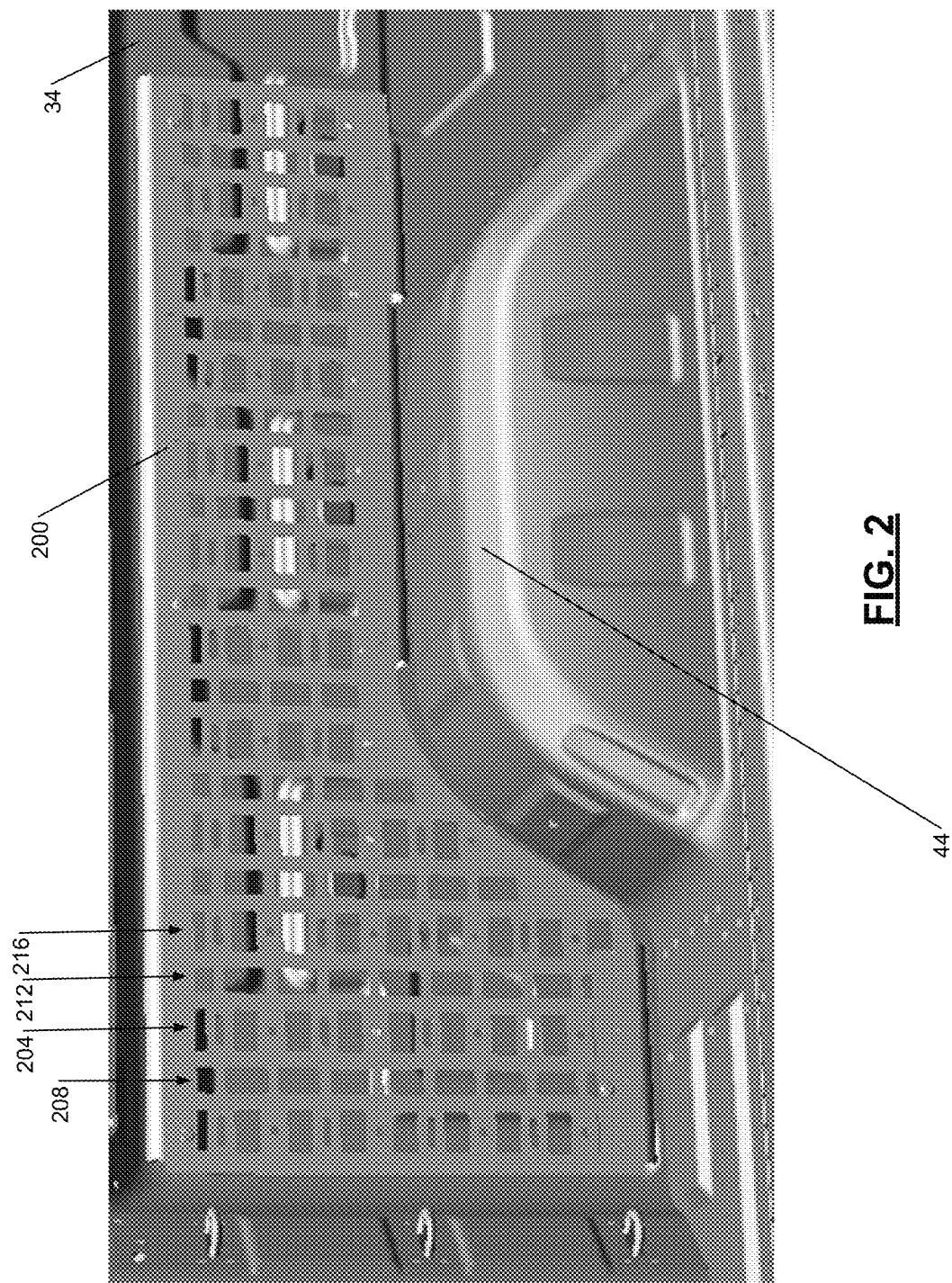
FIG. 2 is a perspective view toward a left interior portion of the cargo bed of a truck and a utility wall.

FIG. 2 is a perspective view toward the left interior portion 34 of the cargo bed 22 and showing the left rear wheel well 44. Utility wall 200 is mounted to the left interior portion 34 via bolts, as discussed further below. As shown, the utility wall 200 extends vertically above the wheel well 44. This may make storing objects above the wheel wells 44 more possible and make the space above the wheel wells 44 more usable.

The utility wall 200 includes a plurality of apertures formed in a moldular lightweight load carrying equipment (MOLLE) scheme. The apertures are arranged alternating first and second vertical columns. A first vertical column, such as 204, is disposed horizontally directly between two second vertical columns, such as 208 and 212. Each first vertical column is disposed directly between two second vertical columns, except for at the horizontal ends of the utility wall 200.

The second vertical column, such as 212, is disposed horizontally directly between two first vertical columns, such as 204 and 216. Each second vertical column is disposed directly between two first vertical columns, except for at the horizontal ends of the utility wall 200. The utility wall 200 may be 6 millimeter (mm) thick aluminum, for example, to maximize strength while minimizing weight and cost. The utility wall 200 may, however, have another thickness and/or be made of another suitable material. The thickness of the utility wall 200 may, for example, be 4 mm to 8 mm.

Figure 3:
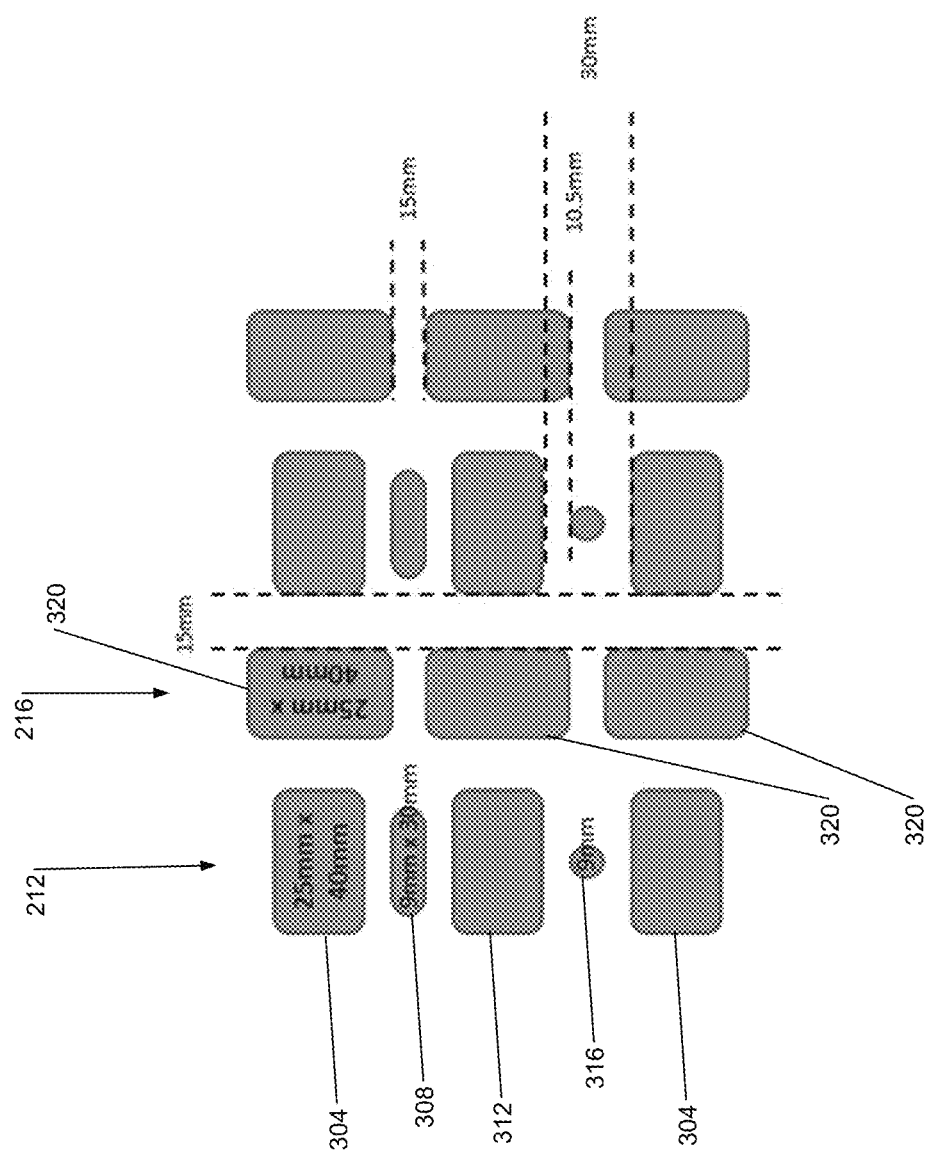
FIG. 3 includes a close-up view of an example portion of the apertures of the utility wall.

FIG. 3 includes a close-up view of an example portion of the apertures of the utility wall. FIG. 3 may be to scale. As discussed above, the utility wall 200 includes alternating first and second vertical columns. Each second vertical column, such as the second vertical column 212, includes a first predetermined pattern of apertures that repeated vertically. The first predetermined pattern of apertures includes a first rectangular aperture 304, an ovular aperture 308 vertically below the first rectangular aperture 304, a second rectangular aperture 312 vertically below the ovular aperture 308, and a circular aperture 316 vertically below the second rectangular aperture 312. The first predetermined pattern of apertures repeats vertically above and below to upper and lower ends of the second vertical column. For example, the first rectangular aperture 304 of a next instance of the first predetermined pattern is vertically located below the circular aperture 316.

The first and second rectangular apertures 304 and 312 are oriented such that longer sides of the rectangles extend horizontally. The first and second rectangular apertures 304 and 312 may be, for example, approximately 25 mm tall× approximately 40 mm wide with rounded edges. The first and second rectangular apertures 304 and 312 having the size and shape described may enable universal latches to be mounted to the utility wall 200 via the first and second rectangular apertures 304 and 312 in a first direction. Approximately as used herein may mean +/−10%.

The ovular aperture 308 may be, for example, approximately 9 mm tall×30 mm wide. The ovular aperture 308 may have an approximately 9 mm tall dimension, for example, to enable items to be bolted to the utility wall 200 using M6 sized bolts. The ovular aperture 308 may have a 30 mm wide dimension, for example, to enable items to be bolted to the utility wall 200 at different horizontal locations. The circular aperture 316 may be, for example, approximately 9 mm in diameter. This may enable items to be bolted to the utility wall 200 using M6 sized bolts.

A vertical distance between a bottom vertical edge of the first rectangular aperture 304 and a top vertical edge of the second rectangular aperture 312 may be approximately 30 mm. A vertical distance between a bottom vertical edge of the second rectangular aperture 312 and a top vertical edge of the next first rectangular aperture 304 may be approximately 30 mm. A vertical distance between the highest vertical most point of the circular aperture 316 and the bottom vertical edge of the second rectangular aperture 312 may be approximately 10.5 mm.

Each first vertical column, such as the first vertical column 216, may include only vertically arranged rectangular apertures. In other words, the first vertical column 216 may include vertically arranged rectangular apertures 320 disposed vertically above and below each other. The vertically arranged rectangular apertures 320 have the same dimensions as the first and second rectangular apertures 304 and 312 (e.g., approximately 25 mm×approximately 40 mm), but are oriented such that longer sides of the rectangles extend vertically. The vertically arranged rectangular apertures 320 may be, for example, approximately 25 mm wide×approximately 40 mm tall with rounded edges. The vertically arranged rectangular apertures 320 having the size and shape described may enable universal latches to be mounted to the utility wall 200 via the vertically arranged rectangular apertures 320 in a second direction. The second direction is perpendicular to the first direction.

A horizontal distance between right most edges of the vertically arranged rectangular apertures 320 and the left most edges of the first and second rectangular apertures of the adjacent second vertical column may be approximately 15 mm, such as to maximize strength. A horizontal distance between left most edges of the vertically arranged rectangular apertures 320 and the right most edges of the first and second rectangular apertures of the adjacent second vertical column may be approximately 15 mm, such as to maximize strength.

Figure 4:
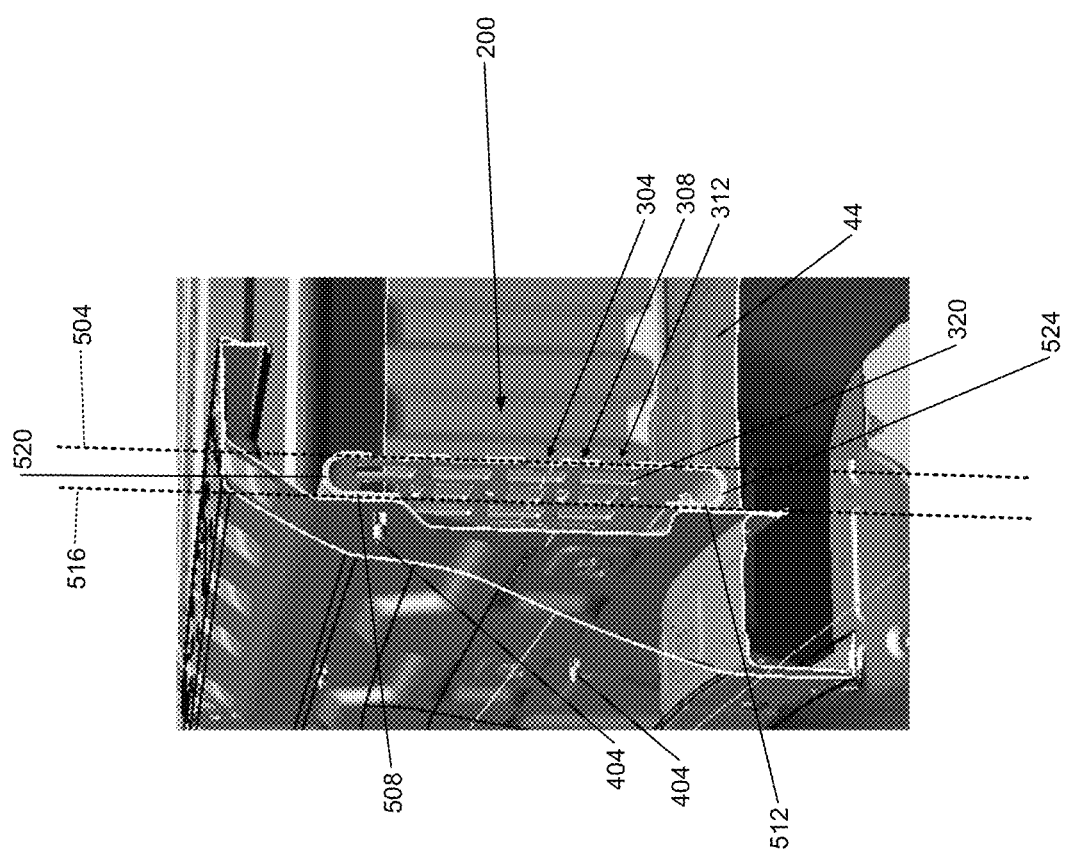
FIGS. 4 and 5 include cross-sectional view including the left interior portion of the cargo bed and the utility wall.
Figure 5:
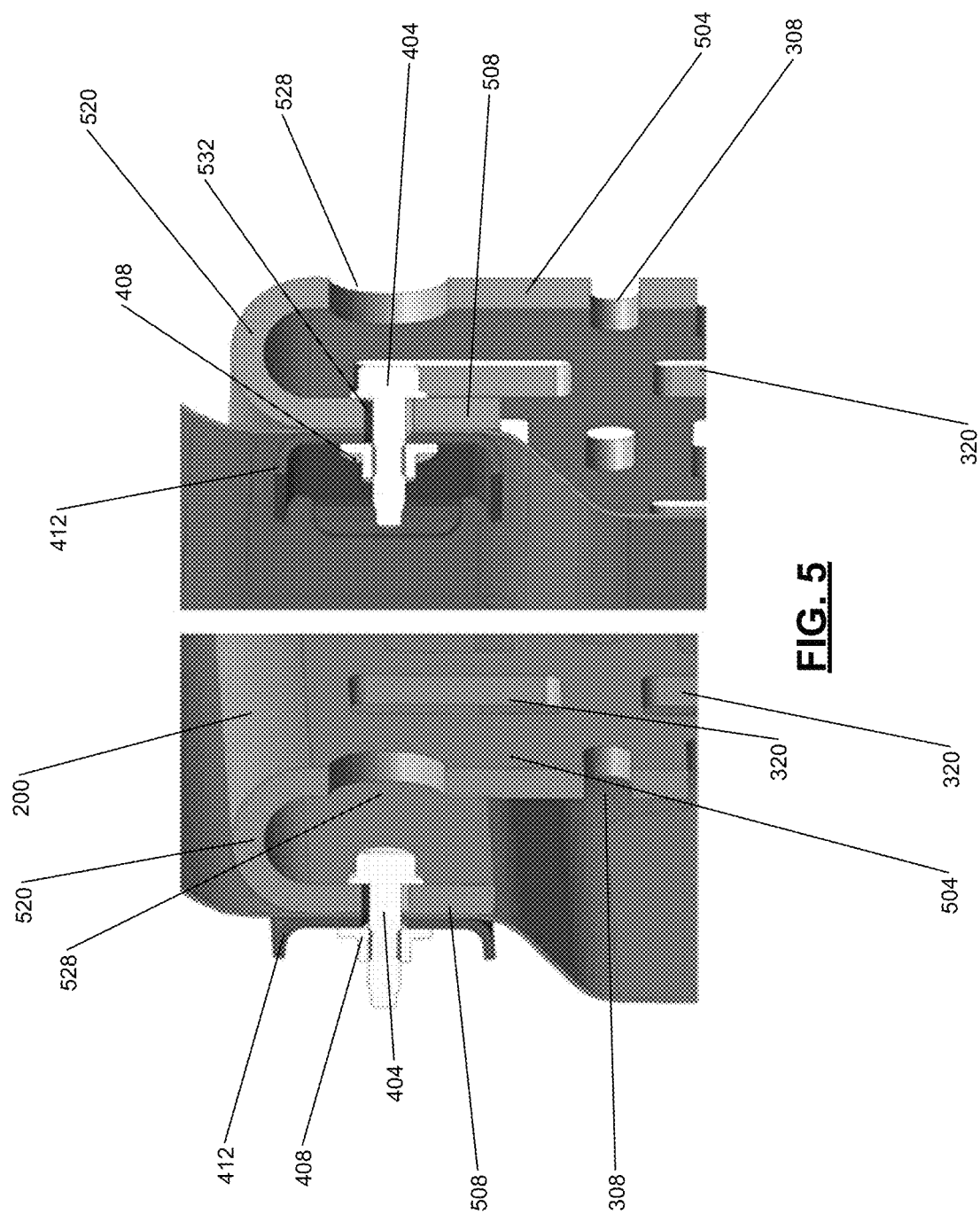

FIGS. 4 and 5 include cross-sectional view including the left interior portion 34 of the cargo bed 22 and the utility wall 200. FIG. 5 includes front and rear perspective views. As illustrated, the utility wall 200 may be bolted to the cargo bed 22 via bolts 404. For example, the left interior portion 34 may include threaded apertures 408. The bolts may extend through apertures in the utility wall 200 and engage the threaded apertures, sleeves, nuts, or members 408. In various implementations, force dispersers 412, or washers, may be disposed between the threaded members 408 and the utility wall 200 to spread force radially outwardly and minimize a risk of deformation of the utility wall 200 at the location where the bolts 404 extend through the utility wall 200.

As illustrated in FIGS. 4 and 5, the utility wall 200 includes a first planar surface 504 through which the apertures 304-320 are formed. The utility wall 200 also includes second and third planar surface 508 and 512 that lie along a second plane 516. The second plane 516 is parallel to the first plane of the first planar surface 504. The utility wall 200 includes a first C-shaped portion 520 that connects a top of the first planar surface 504 with the second planar surface 508. The utility wall also includes a second C-shaped portion 524 that connects the bottom of the first planar surface 504 with the third planar surface 512. A distance between the first plane 504 and the second plane 516 may be approximately 17 mm or another suitable distance.

The utility wall 200 can be bolted to the cargo bed 22 via apertures through the second and third planar surfaces 508 and 512. As illustrated in FIG. 5, bolt apertures (e.g., circular) 528 may be formed through the first planar surface 504 and be coaxial with bolt apertures 532 through the second and third planar surfaces 508 and 512. Additionally or alternatively, one or more of the bolt apertures 532 may be accessible through one of the rectangular apertures 304, 312, or 320 through the first planar surface 504. The first and second planes 504 and 516 may be perpendicular or approximately perpendicular to a plane of the floor of the cargo bed 22.

Figure 7:
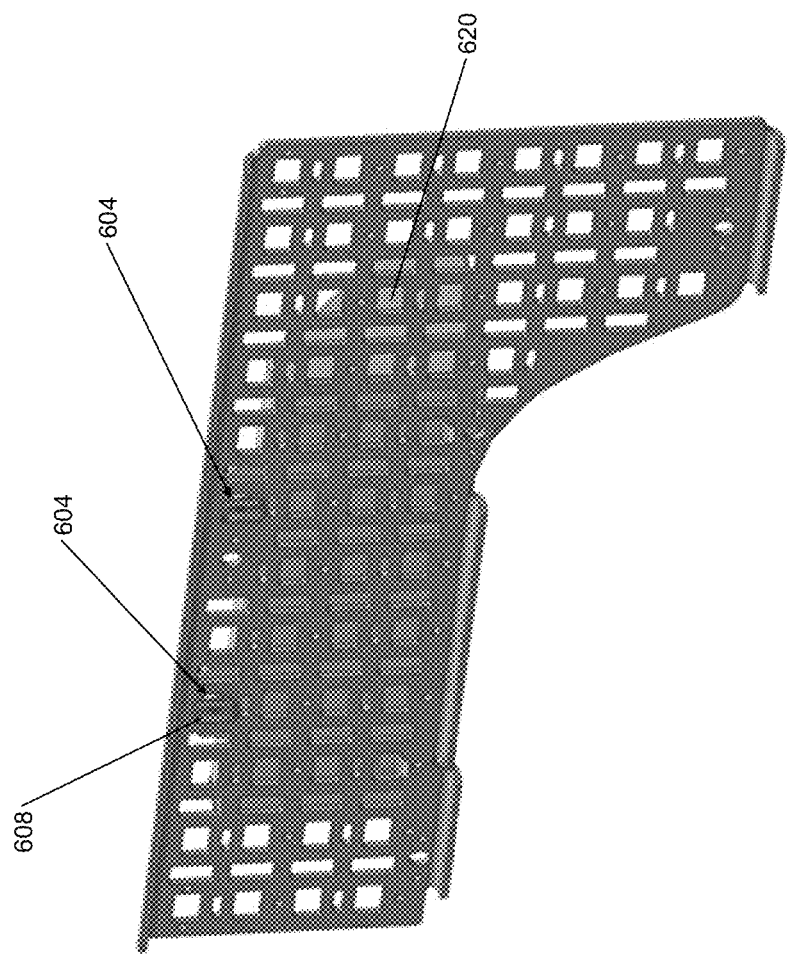
FIGS. 6 and 7 include perspective views including portions of the utility wall and example latches.
Figure 6:
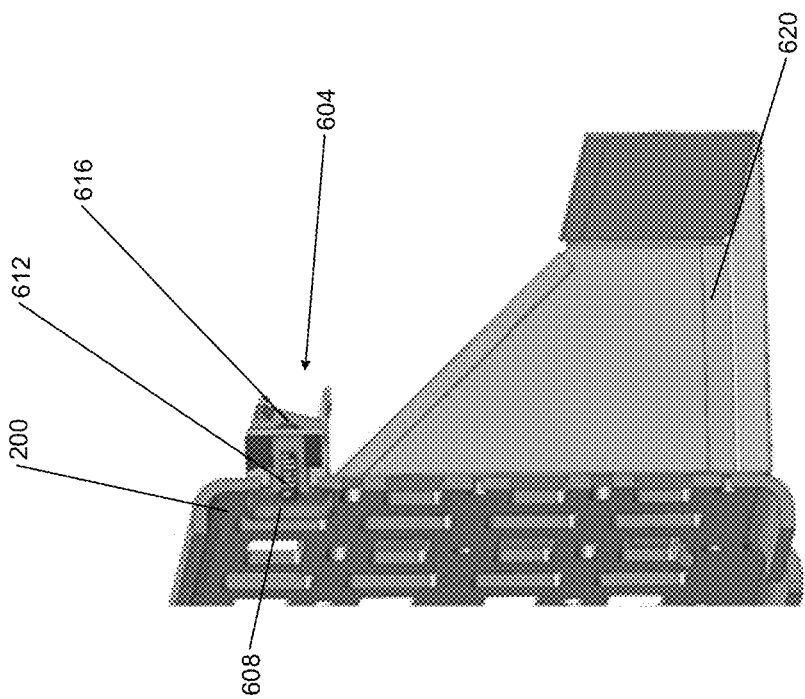

FIGS. 6 and 7 include perspective views including portions of the utility wall 200 and example latches 604. The latches 604 may include a rectangular portion 608 configured to fit through the rectangular apertures 304, 312, and 320. The latches 604 also include a biasing device 612, such as a spring, and a front portion 616. When force is applied to the front portion 616, the front portion 616 compresses the biasing device 612 and urges the rectangular portion 608 through one of the rectangular apertures 304, 312, and 320. The rectangular portion 608 can be rotated (e.g., by approximately 90 degrees) such that the longer sides of the rectangular portion 608 are non-parallel to (e.g., approximately 90 degrees from) the longer sides of the one of the rectangular apertures 304, 312, and 320. When force is removed, the biasing device 612 holds the latch 604 to the utility wall 200.

Various different types of accessories can be mounted to the utility wall via the latches 604. For example, FIGS. 6 and 7 illustrate the example of a shelf 620 being mounted to the utility wall 200 via latches.

Figure 9:
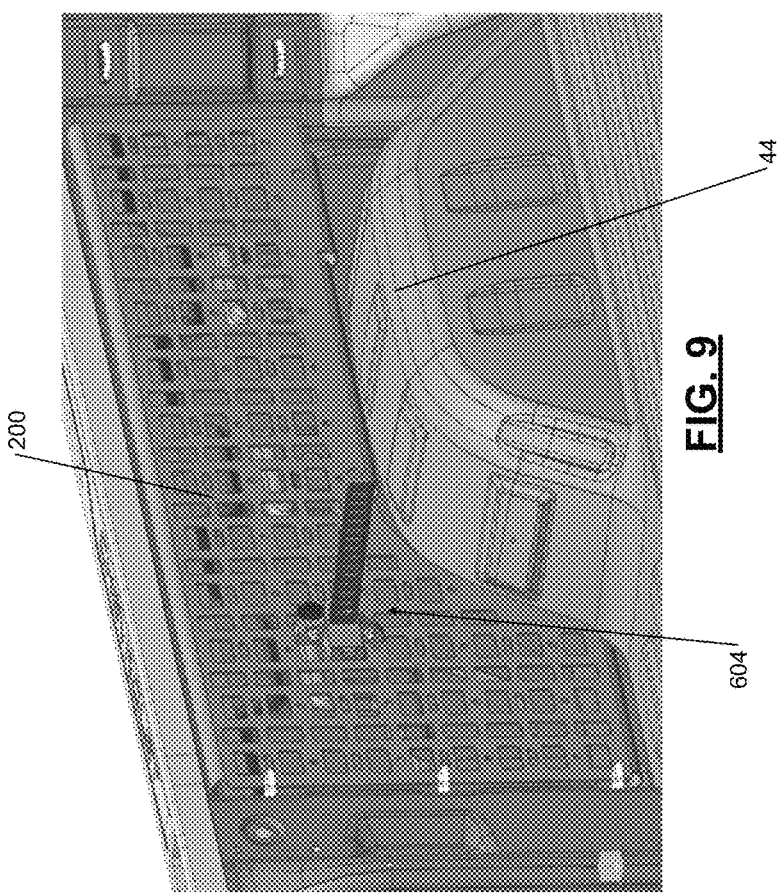
FIG. 9 includes a perspective view with latches oriented in a second direction.
Figure 8:
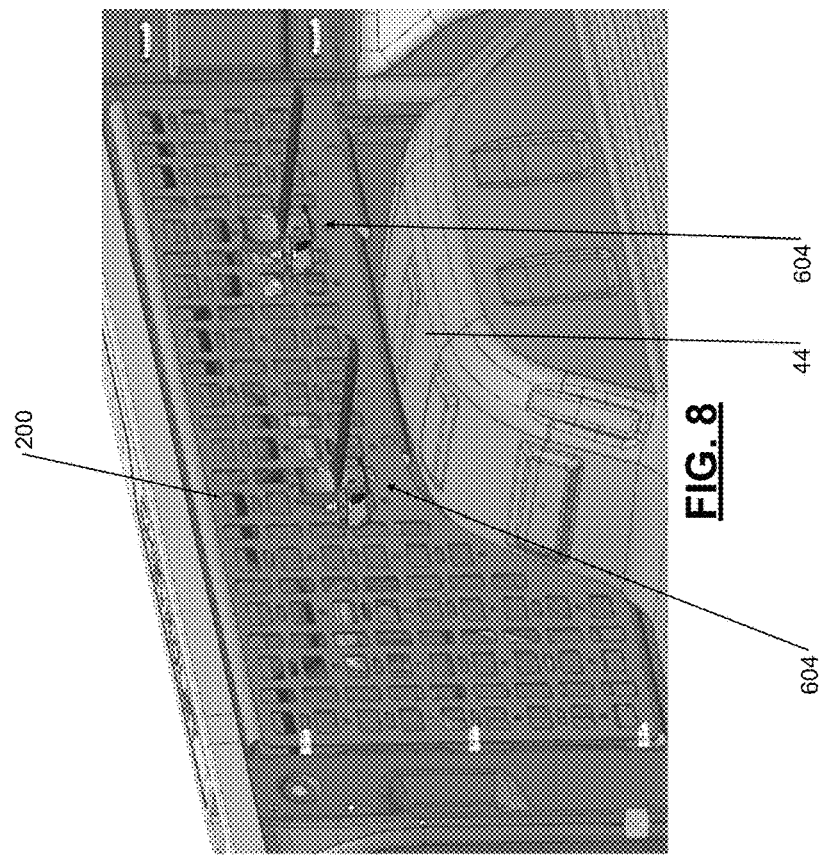
FIG. 8 includes a perspective view with latches oriented in a first direction.

As discussed above, the rectangular apertures 304, 312, and 320 oriented with their respective long sides in different directions enables mounting of latches to the utility wall in different directions. For example, FIG. 8 includes a perspective view with latches oriented in a first direction, and FIG. 9 includes a perspective view with latches oriented in a second direction. In the examples of FIGS. 8 and 9, the first and second directions are approximately perpendicular (90 degrees) to each other. As illustrated in, for example, FIG. 8, the utility wall 200 aids in storage of items above the wheel wells 44. A second type of accessory is illustrated in FIGS. 8 and 9.

Figure 10:
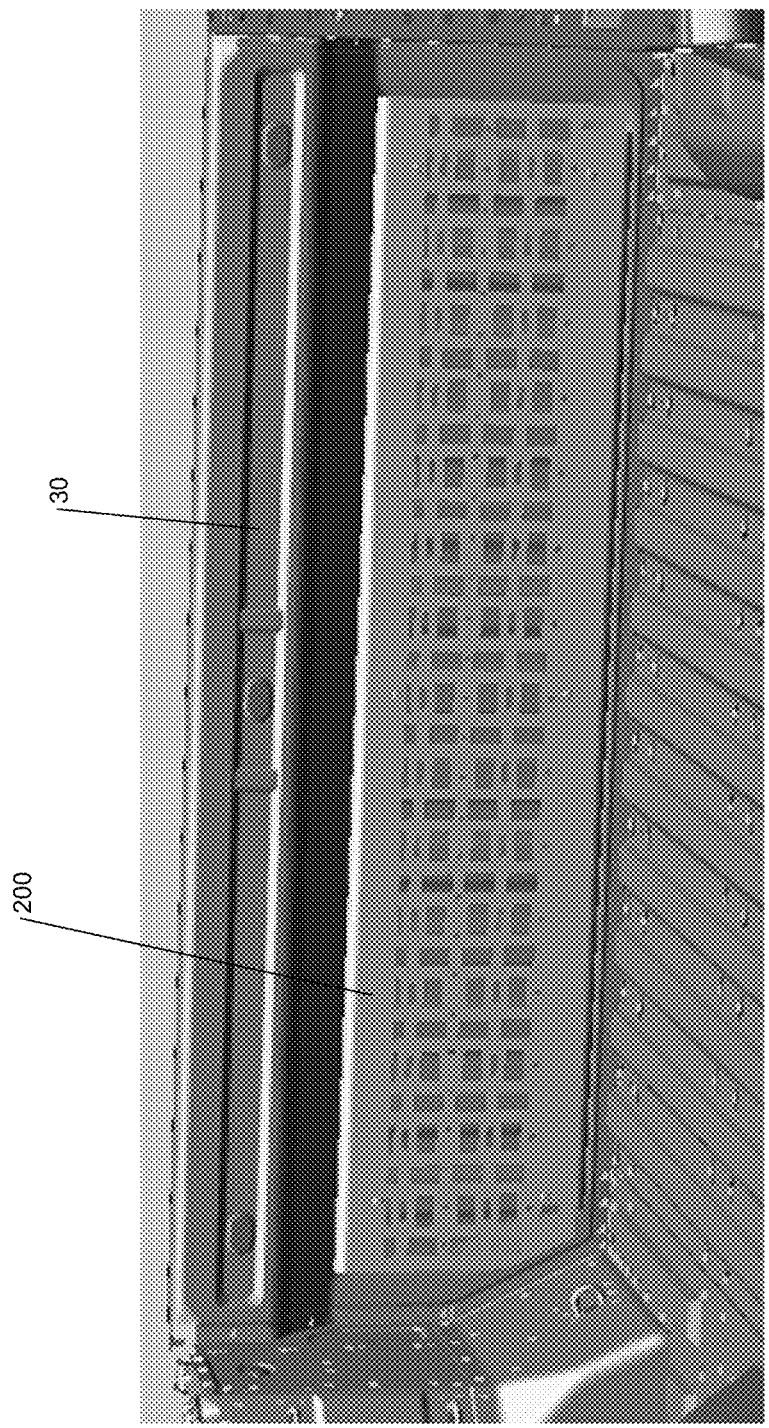
FIG. 10 includes a perspective view of an example implementation of the utility wall being mounted to the front interior portion of the cargo bed.

As discussed above, while the example of the left interior portion 34 is provided as an example, the present application is also applicable to the utility wall 200 being mounted to the right interior portion 36, the front interior portion 30, or the rear interior portion 32 of the cargo bed 22. For example, FIG. 10 includes a perspective view of an example implementation of the utility wall 200 being mounted to the front interior portion 30 of the cargo bed 22.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

What is claimed is:

1. A utility wall for a pickup truck, the utility wall comprising:
   a first portion disposed along a first plane and including alternating first and second vertical columns of apertures, wherein:
      the first vertical columns include a vertically repeating pattern including:
         first rectangular apertures with longer sides oriented in a first direction;
         ovular apertures; and
         circular apertures; and
      the second vertical columns include second rectangular apertures with longer sides oriented in a second direction that is different than the first direction;
   second and third portions disposed along a second plane that is parallel to the first plane, the second and third portions including bolt apertures through which bolts can extend to bolt the utility wall to the pickup truck;
   a first c-shaped portion that connects a first end of the first portion to the second portion; and
   a second c-shaped portion that connects a second end of the first portion to the third portion.

2. The utility wall of claim 1 wherein the first and second rectangular apertures have rounded corners.

3. The utility wall of claim 1 wherein the vertically repeating pattern includes:
   a first one of the first rectangular apertures;
   one of the ovular apertures disposed vertically below the first one of the first rectangular apertures;
   a second one of the first rectangular apertures disposed vertically below the one of the ovular apertures; and
   one of the circular apertures disposed vertically below the second one of the first rectangular apertures.

4. The utility wall of claim 3 wherein:
   a first distance between a vertically upper edge of the one of the ovular apertures and a vertically lower most edge of the first one of the first rectangular apertures is approximately 10.5 millimeters; and
   a second distance between a vertically lower most edge of the one of the ovular apertures and a vertically upper most edge of the second one of the first rectangular apertures is approximately 10.5 millimeters.

5. The utility wall of claim 3 wherein:
   a first distance between a vertically upper most point of the one of the circular apertures and a vertically lower most edge of the second one of the first rectangular apertures is approximately 10.5 millimeters; and
   a second distance between a vertically lower most point of the one of the circular apertures and a vertically upper most edge of a third one of the first rectangular apertures is approximately 10.5 millimeters.

6. The utility wall of claim 1 wherein the first rectangular apertures are approximately 25 millimeters by 40 millimeters.

7. The utility wall of claim 1 wherein the second rectangular apertures are approximately 25 millimeters by 40 millimeters.

8. The utility wall of claim 1 wherein the first direction is approximately 90 degrees from the second direction.

9. The utility wall of claim 1 wherein the ovular apertures are approximately 9 millimeters vertically by approximately 30 millimeters horizontally.

10. The utility wall of claim 1 wherein the circular apertures have a diameter of approximately 9 millimeters.

11. The utility wall of claim 1 wherein a distance between a horizontally left most edge of each of the second rectangular apertures is approximately 15 millimeters from a horizontally right most edge of each of the first rectangular apertures.

12. The utility wall of claim 1 wherein a distance between a horizontally right most edge of each of the second rectangular apertures is approximately 15 millimeters from a horizontally left most edge of each of the first rectangular apertures.

13. The utility wall of claim 1 wherein the first portion, the second portion, the third portion, the first c-shaped portion, and the second c-shaped portion are made of aluminum.

14. The utility wall of claim 1 wherein the first portion, the second portion, the third portion, the first c-shaped portion, and the second c-shaped portion are made of approximately 6 millimeter thick aluminum.

15. The utility wall of claim 1 wherein a distance between vertically bottom most edges of the second rectangular apertures and vertically upper most edges of adjacent ones of the second rectangular apertures is approximately 15 millimeters.

16. The utility wall of claim 1 wherein:
    a vertically upper most edge of one of the ovular apertures falls on a first line with a vertically lower most edge of a first one of the second rectangular apertures; and
    a vertically lower most edge of the one of the ovular apertures falls on a second line with a vertically upper most edge of a second one of the second rectangular apertures.

17. The utility wall of claim 1 wherein:
    a vertically upper most point of one of the circular apertures falls on a first line with a vertically lower most edge of a first one of the second rectangular apertures; and
    a vertically lower most point of the one of the circular apertures falls on a second line with a vertically upper most edge of a second one of the second rectangular apertures.

18. The utility wall of claim 1 wherein a portion of the first portion extends vertically over a wheel well of the pickup truck.

19. The utility wall of claim 1 wherein the second and third portions include the bolt apertures through which bolts can extend to bolt the utility wall to one of a left, right, front, and rear interior portion of the cargo bed.

20. A system for the pickup truck, the system comprising:
    the utility wall of claim 1; and
    a latch configured to latch to the utility wall via the first rectangular apertures and the second rectangular apertures.

* * * * *